(12) United States Patent
Turner et al.

(10) Patent No.: US 9,423,022 B2
(45) Date of Patent: Aug. 23, 2016

(54) APPARATUS AND METHODS FOR DETERMINING VEHICULAR TRANSMISSION OUTPUT TORQUE

(71) Applicant: Honda Motor Co., Ltd., Tokyo (JP)

(72) Inventors: Steve Turner, Marysville, OH (US); Randy Skiles, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 14/330,933

(22) Filed: Jul. 14, 2014

(65) Prior Publication Data

US 2016/0010746 A1 Jan. 14, 2016

(51) Int. Cl.
*F16H 61/02* (2006.01)

(52) U.S. Cl.
CPC .... *F16H 61/0213* (2013.01); *F16H 2061/0216* (2013.01); *F16H 2061/0241* (2013.01)

(58) Field of Classification Search
None
See application file for complete search history.

(56) References Cited

U.S. PATENT DOCUMENTS

| | | | |
|---|---|---|---|
| 5,033,328 A | 7/1991 | Shimanaka | |
| 5,788,601 A * | 8/1998 | Kuriyama | F16H 61/0213 477/71 |
| 6,687,591 B2 | 2/2004 | Abe | |
| 6,991,583 B2 | 1/2006 | Saitou et al. | |
| 7,236,869 B2 | 6/2007 | Buckley et al. | |
| 7,300,381 B2 | 11/2007 | Badillo et al. | |
| 7,651,440 B2 | 1/2010 | Runde | |
| 7,731,629 B2 | 6/2010 | Asami et al. | |
| 7,762,925 B2 | 7/2010 | Dickinson | |
| 8,328,688 B2 | 12/2012 | Fujii et al. | |
| 8,337,361 B2 | 12/2012 | Fujii et al. | |
| 8,403,812 B2 | 3/2013 | Turski et al. | |
| 8,529,405 B2 | 9/2013 | Fujii et al. | |
| 8,636,613 B2 | 1/2014 | Teslak et al. | |
| 2011/0029207 A1 * | 2/2011 | Sasahara | F16D 48/06 701/56 |
| 2014/0005867 A1 * | 1/2014 | Wang | B60W 20/10 701/22 |

* cited by examiner

*Primary Examiner* — Edwin A Young
(74) *Attorney, Agent, or Firm* — Kenealy Vaidya LLP

(57) ABSTRACT

Some embodiments relate to determining an estimated torque output by a vehicular transmission. A first controller determines a target gear number and an actual gear number during shifting between the gears of the transmission, the target gear number being equal to a value of a gear number to which the transmission is shifting, the actual gear number being equal to a value of a gear number from which the transmission is shifting. A second controller compares the target gear number to the actual gear number and retrieves a blended gear number if the target gear number is greater than the actual gear number, determines an approximate value for a gear ratio that decreases in proportion to a rate of decrease in torque output by the transmission based on the blended gear number, and estimates a value of the torque output by the transmission based on the determined gear ratio.

20 Claims, 8 Drawing Sheets

| G | GR |
|---|---|
| 1 | 3.46 |
| 2 | 1.87 |
| 3 | 1.24 |
| 4 | 0.95 |
| 5 | 0.81 |
| 6 | 0.73 |

FIG. 3

| G | GR |
|---|---|
| 2 | 1.87 |
| 2.1 | 1.81 |
| 2.2 | 1.74 |
| 2.3 | 1.68 |
| 2.4 | 1.49 |
| 2.5 | 1.56 |
| 2.6 | 1.49 |
| 2.7 | 1.43 |
| 2.8 | 1.37 |
| 2.9 | 1.30 |
| 3 | 1.24 |

FIG. 4

APPARATUS AND METHODS FOR DETERMINING VEHICULAR TRANSMISSION OUTPUT TORQUE

BACKGROUND

The disclosed subject matter relates to vehicle powertrains, and methods of use and manufacture thereof. More particularly, the disclosed subject matter relates to apparatus and methods for determining vehicular transmission output torque.

Some related art vehicles utilize a multi-ratio transmission to modify torque produced by an internal combustion engine, and then to output the modified torque to drive wheels. The real-time value of the transmission's torque output may be relevant to the operation of certain performance enhancement systems, such as but not limited to traction control, dynamic stability control, and all-wheel-drive control. Thus, some related art vehicles include systems for sensing the actual torque output of the transmission in real time, and then use this data in conjunction with the performance enhancement systems cited above.

SUMMARY

However, these related art systems can be disadvantageous in various respects, such as by increasing vehicular weight, requiring complex designs, being expensive to assemble and/or maintain, lacking sufficient durability and/or reliability for daily use such as in certain weather conditions, etc. These and other factors can outweigh advantages provided by the systems for sensing the actual transmission output torque.

Thus, instead of sensing actual transmission output torque, it may be advantageous to estimate torque, such as based on at least one of the following types of data: an engine map, transmission gear ratio value(s), transmission shift status, torque converter map, and predetermined driveline losses. However, some of these estimation techniques may be subject to certain disadvantages, such as inaccuracies during a shift (up or down) from a one gear ratio to another gear ratio. Accuracy of these calculations may be especially important for four-wheel drive (4WD) systems, such as to accurately distribute torque to the rear wheels.

Some multi-ratio transmissions utilize multiple gears to provide multiple gear ratios, and a plurality of clutches are used to selectively engage/disengage certain combinations of the gears for the purpose of connecting the transmission output to the transmission input via the appropriate gear ratio. Typically, more than one clutch is actuated to select and de-select the relevant gear ratio. Any variation in the actuation rate and actuation pressure of each clutch involved in the shift can cause a fluctuation in the transmission's output torque. The actuation rate and pressure of each clutch can also vary over the transmission lifetime. Thus, it can be difficult to accurately and/or reliably model the transmission output torque through each relevant clutch during each operation of the relevant clutch(es) over the vehicle lifetime, even if the vehicle is reasonably maintained.

In some transmission output toque estimation systems, the actual gear position can be used to determine a torque multiplication factor inside the transmission, which can be assigned a constant value based on the currently selected gear. For example, one constant value can be used for one gear, and a different constant value can be used for a different gear. However, this procedure does not sufficiently address gear shifting and thus can result in inaccuracies.

The above inaccuracies can be exaggerated if the estimated torque is utilized by a controller that distributes torque individually between a powertrain's wheels based on an algorithm. This distribution can be implemented between: the left and right wheels in a two-wheel drive powertrain, the front and rear wheels in an all-wheel drive powertrain, or between the left rear wheel and the right rear wheel in an all-wheel drive powertrain. An over-estimation of the real-time torque output can result in a less advantageous distribution of torque between the front and rear wheels as compared to an accurate estimation, which may not provide an advantageous dynamic situation. In some such situations, this over-estimation can cause instability or a perception of instability while the vehicle is being driven. Over-estimating the real-time torque output can be similarly less advantageous as compared to an under-estimation of the real-time torque output.

In order to enhance shift smoothness as perceived by the vehicle occupant(s), automatic transmissions can be configured to reduce the magnitude of the torque output immediately prior to a shift from a lower gear number (for example, $2^{nd}$ gear) to a higher gear number (for example, $3^{rd}$ gear). This procedure enables the torque output immediately prior to the shift to be substantially equal to the torque immediately subsequent to the shift. This configuration thereby reduces or minimizes the perceived shift shock.

However, this active torque reduction can increase, amplify or intensify inaccuracies in a torque distribution algorithm that relies on an estimated real-time output torque. For example, failing to use a reduction factor can cause the calculated output torque value to be too high during up-shifts, which can cause an actual or perceived real wheel torque bias. This bias can cause performance issues under certain circumstances, such as making the vehicle difficult to drive in snow.

It may therefore be beneficial to provide apparatus and methods that address at least one of the above issues. For example, it may be beneficial to provide apparatus and methods for more accurately estimating available torque during a transmission shift operation. It may be especially beneficial to estimate this torque during an upshift event.

Some embodiments are therefore directed to an apparatus for determining an estimated torque output by a transmission of a vehicle, wherein the transmission is shiftable between multiple gears. The apparatus can include an electronic storage device that stores a blended gear number; and a first controller configured to determine a target gear number and an actual gear number during shifting between the gears of the transmission. The target gear number can be equal to a value of a gear number to which the transmission is shifting, and the actual gear number can be equal to a value of a gear number from which the transmission is shifting. The apparatus can also include a second controller configured to: compare the target gear number to the actual gear number and to retrieve the blended gear number from the storage device if the target gear number is greater than the actual gear number, determine an approximate value for a gear ratio that decreases in proportion to a rate of decrease in torque output by the transmission based on the blended gear number, and estimate a value of the torque output by the transmission based on the determined gear ratio.

Some other embodiments are directed to method for determining an estimated torque output by a transmission of a vehicle, wherein the transmission is shiftable between multiple gears. The method can include storing a blended gear number; and using a first processor to determine a target gear number and an actual gear number during shifting between the gears of the transmission. The target gear number can be equal to a value of a gear number to which the transmission is shifting, and the actual gear number can be equal to a value of a gear number from which the transmission is shifting. The method can also include using a second processor to: compare the target gear number to the actual gear number, and to retrieve the blended gear number from the storage device if the target gear number is greater than the actual gear number, determine an approximate value for a gear ratio that decreases in proportion to a rate of decrease in torque output by the transmission based on the blended gear number, and estimate a value of the torque output by the transmission based on the determined gear ratio.

Still other embodiments are directed to torque distribution control system for distributing torque output by a transmission among front and rear wheels of a vehicle, wherein the transmission is shiftable between multiple gears. The vehicle can include at least one clutch configured to selectively couple at least one of the front and rear wheels to the transmission. The torque distribution control system can include an electronic storage device that stores a blended gear number; and a first controller configured to determine a target gear number and an actual gear number during shifting between the gears of the transmission. The target gear number can be equal to a value of a gear number to which the transmission is shifting, and the actual gear number can be equal to a value of a gear number from which the transmission is shifting. The system can also include a second controller configured to: compare the target gear number to the actual gear number and to retrieve the blended gear number from the storage device if the target gear number is greater than the actual gear number, determine an approximate value for a gear ratio that decreases in proportion to a rate of decrease in torque output by the transmission based on the blended gear number, estimate an output torque based on the determined gear ratio, determine a torque distribution based on the estimated torque among the front and rear wheels, and instruct the clutch to couple at least one of the front and the rear wheels to the transmission based on the determined torque distribution.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is an exemplary look-up table of gear number values and corresponding gear ratio values.

FIG. 4 is an exemplary look-up table of blended gear number values and corresponding blended gear ratio values in accordance with the disclosed subject matter.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Exemplary Powertrain

Figure 1:
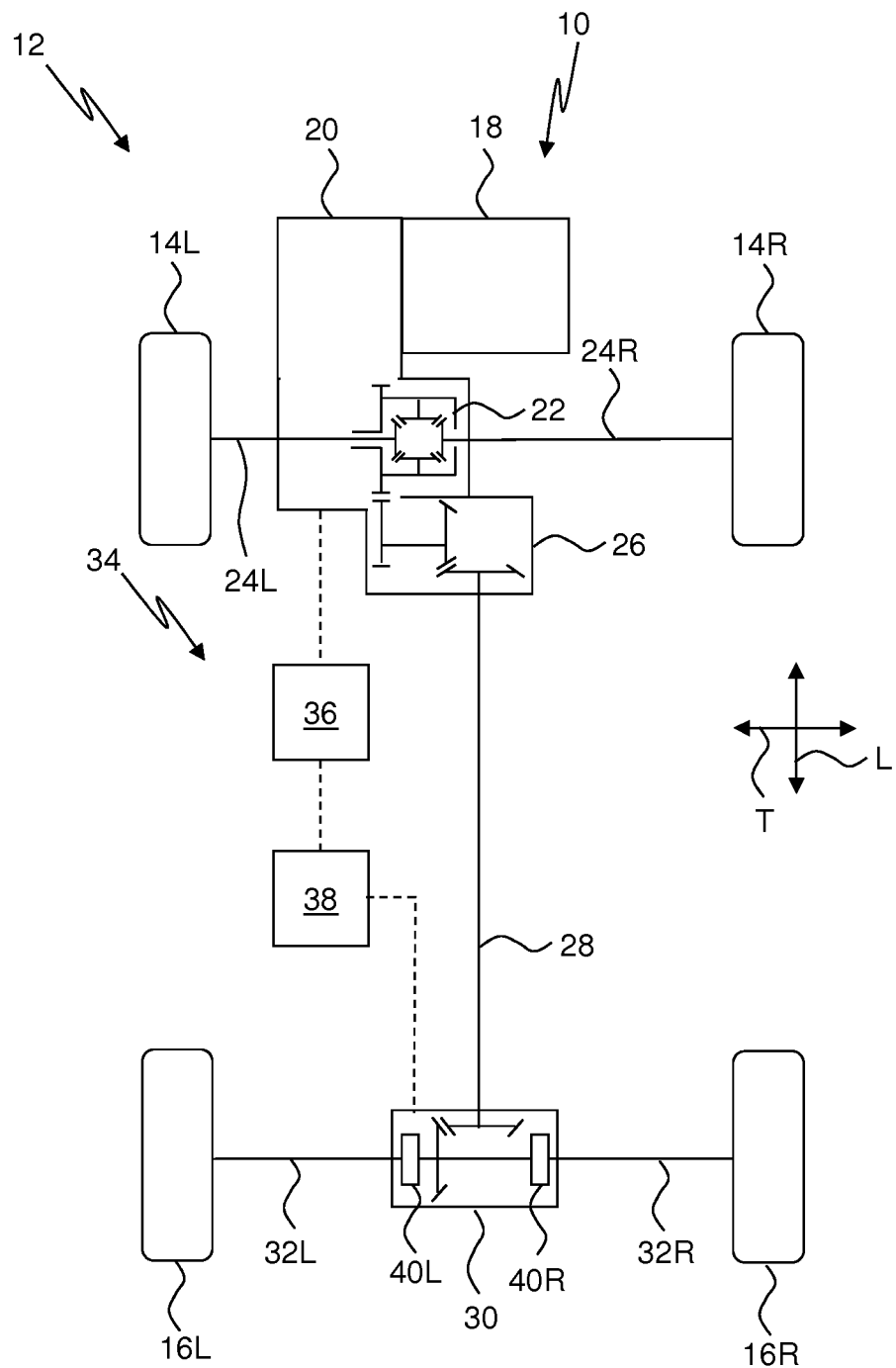
FIG. 1 is a schematic view of a powertrain for a vehicle in accordance with the disclosed subject matter.

FIG. 1 is a schematic view of a powertrain for a vehicle in accordance with the disclosed subject matter. FIG. 1 illustrates an embodiment of a powertrain 10 for a vehicle 12, where the vehicle 12 has a longitudinal direction L and a transverse direction T perpendicular to the longitudinal direction. The powertrain 10 can be configured as an on-demand, part-time, all-wheel drive system in accordance with principles of the disclosed subject matter. However, exemplary embodiments are intended to include or otherwise cover other powertrain configurations.

This exemplary powertrain 10 can be configured such that the steerable front wheels 14L, 14R are the primary drive wheels, and the rear wheels 16L, 16R are automatically selectively driven when additional tractive effort is advantageous for the given vehicle conditions. However, the powertrain 10 can also be configured such that the rear wheels 16L, 16R are the primary drive wheels and the front wheels 14L, 14R are driven to supplement the tractive effort. In other embodiments, the powertrain 10 can be configured as: a full-time all-wheel drive system; a manually-engagable, part-time all-wheel drive system; a front-wheel drive system; or a rear-wheel drive system.

The powertrain 10 can include the pair of front wheels 14L, 14R, the pair of rear wheels 16L, 16R, a power source 18, a transmission 20, a front differential assembly 22, a pair of front driveshafts 24L, 24R, a power-take-off assembly 26, a propeller shaft 28, a rear differential assembly 30, a pair of rear driveshafts 32L, 32R, all arranged in any appropriate manner, and a control system 34.

The transmission 20 can include a plurality of gears that can be selectively engaged/disengaged in different combinations to create a respective plurality of gear ratios. For example, the transmission 20 can include gear numbers 1, 2, ... n, and the gear numbers 1, 2, ... n can be engaged with one or more respective gears of the plurality to provide a first gear ratio, second gear ratio, ... n gear ratio. The gear number can be any appropriate integer number.

The value of the gear number can be different from the value of the corresponding gear ratio. The gear ratio number can be any appropriate rational number. In an exemplary embodiment, the transmission 20 can have n gear ratios that decrease in numerical value as the gear number increases in numerical value. For example, the gear having a gear number value of 1 ("first gear") can have a gear ratio value of 3.46:1; a gear having a gear number value of 2 ("second gear") can have a gear ratio value of 1.47:1, and the $n^{th}$ gear can have an $n^{th}$ gear ratio of 0.73:1.

The gear number currently engaged in the transmission 20 can be referred to as the actual gear number. The gear number that the transmission will shift to can be referred to as the target gear number. If the transmission 20 shifts from an actual gear number to a target gear number that has a greater numerical value than that for the actual gear number, then the shift can be referred to as an upshift. For example, a shift from the first gear number to the second gear number is an upshift. If the transmission 20 shifts from the actual gear number to a target gear number that has a lesser numerical value than that for the actual gear number, then the shift can be referred to as a downshift. For example, a shift from the $n^{th}$ gear number to the third gear number is a downshift.

The control system 34 can be configured to automatically engage/disengage the rear wheels 16L, 16R from the power source 18 and the transmission 20, as appropriate. The control system 34 can include a first controller 36, a second controller 38, and a pair of clutch assemblies 40L, 40R. The dotted lines of FIG. 1 schematically represent any appropriate wired or wireless electrical communication between the components of the control system 34.

The first controller 36 can be in electrical communication with the transmission 20 and the second controller 38, either directly or over an electronic network. The first controller 36 can also be in electrical communication with sensor(s) and/or other controller(s) associated with the power source 18, powertrain 10, and/or the transmission 20.

The second controller 38 can be in electrical communication with the clutch assemblies 40L, 40R, either directly or over an electronic network. The second controller 38 can also be in electrical communication with sensor(s) and/or other controller(s) associated with the powertrain 10.

In accordance with some embodiments, the second controller 38 is in electrical communication with one or more other vehicle systems and/or sensor(s) that can provide data indicative of vehicle dynamic conditions. These conditions include, but are not limited to, yaw angle, yaw rate, roll rate, acceleration in the transverse direction T (i.e., lateral acceleration), steering angle, steering angle rate, brake force, brake pedal position, suspension loads, cargo load, trailer load, air temperature, surface condition(s) (such as but not limited to dry, wet, snowy, icy, surfaces), and surface type (such as but not limited to paved, gravel, sand, dirt, mud, rocky, rutted surfaces).

The pair of clutch assemblies 40L, 40R can be components of the rear differential assembly 30. The clutch assemblies 40L, 40R can be configured in any appropriate manner suitable for use in an on-demand all-wheel-drive powertrain (or other drive wheel configurations).

Based on data received from one or more of the above-referenced sensors and/or systems, as well as data received from the first controller 36, the second controller 38 can manipulate the clutch assemblies 40L, 40R to vary the distribution of torque produced by the power source 18, multiplied by the transmission 20, and routed through one or both of the clutch assemblies 40L, 40R to the respective rear wheel 16L, 16R. This manipulation can, among other features, enhance the tractive effort of the vehicle 12 when the vehicle 12 travels along a low traction surface, such as but not limited to wet, snowy, icy, gravel, or muddy surfaces. Further, this manipulation of the clutches 40L, 40R can enhance the actual and/or perceived performance of the vehicle 12 as it enters, traverses, and/or exits a curve. Specifically, the second controller 38 can distribute torque through only one of the clutch assemblies 40L, 40R, or send a greater amount of torque through one of the clutch assemblies 40L, 40R than through the other of the clutch assemblies 40L, 40R. This operation enables an advantageous amount of torque to be sent to the rear wheel (16L or 16R) with the most effective traction, and/or enhances the steering of the vehicle 12 via torque vectoring.

The second controller 38 can be configured to process the data received from the first controller 36 and other appropriate system(s) and/or sensor(s), and to generate a torque signal such that the clutches 40L, 40R distribute the torque from the transmission 20 to the respective rear wheel 16L, 16R in a finely tuned manner. This finely tuned signaling by the second controller 38 also can permit precise differentiation in the amount of torque transmitted by the clutches 40L, 40R as compared to the amount of torque transmitted to the front wheels 14L, 14R.

As a result, the control system 34 can enhance the actual or perceived launching of the vehicle 12 from a stop, and can modulate with finer increments and/or greater confidence the transitions between the two-wheel-drive mode and the all-wheel-drive mode, etc. Also, the control system 34 can enhance performance of the vehicle 12 on a low friction surface, such as but not limited to wet, icy, snowy, gravel or muddy surfaces. The second controller 38 can also enhance performance of the vehicle 12, where the wheels (for example, the left wheels 14L, 16L) on one side of the vehicle 12 engage a surface having a coefficient of friction, p, that is different from that of the surface engaged by the wheels (for example, the right side wheels 4R, 16R) on the other side of the vehicle 12. This latter condition can be referred to as a split μ surface.

This fine tuned signaling by the second controller 38 also can permit precise differentiation in the amount of torque transmitted by one of the clutches 40L, 40R as compared to the other of the clutches 40L, 40R. As a result, the control system 34 can enhance the operator's steering input to enhance the vehicle's tracking into, through and/or out of a corner, etc. This enhancement can also be beneficial to enhance steering performance on a low friction surface or on a split p surface.

As discussed above, it can be advantageous to configure the second controller 38 to estimate the real-time torque output by the transmission 20. However, when the transmission 20 performs an upshift, the first controller 36 can signal the transmission 20 to gradually decrease the torque output to a value that can correspond to the torque outputted by the transmission 20 after the upshift is complete. This reduction of the torque output can improve the vehicle occupant's perception of the shift feeling.

However, the torque reduction signal generated by the first controller 35 may not be sent to the second controller 38. Thus, the second controller 38 can be configured with hardware, alone or in combination with software, to compensate for the gradually decreasing torque output if the second controller 38 estimates the torque output during an upshift event occurring in the transmission 20.

II. Exemplary Algorithm

Figure 2:
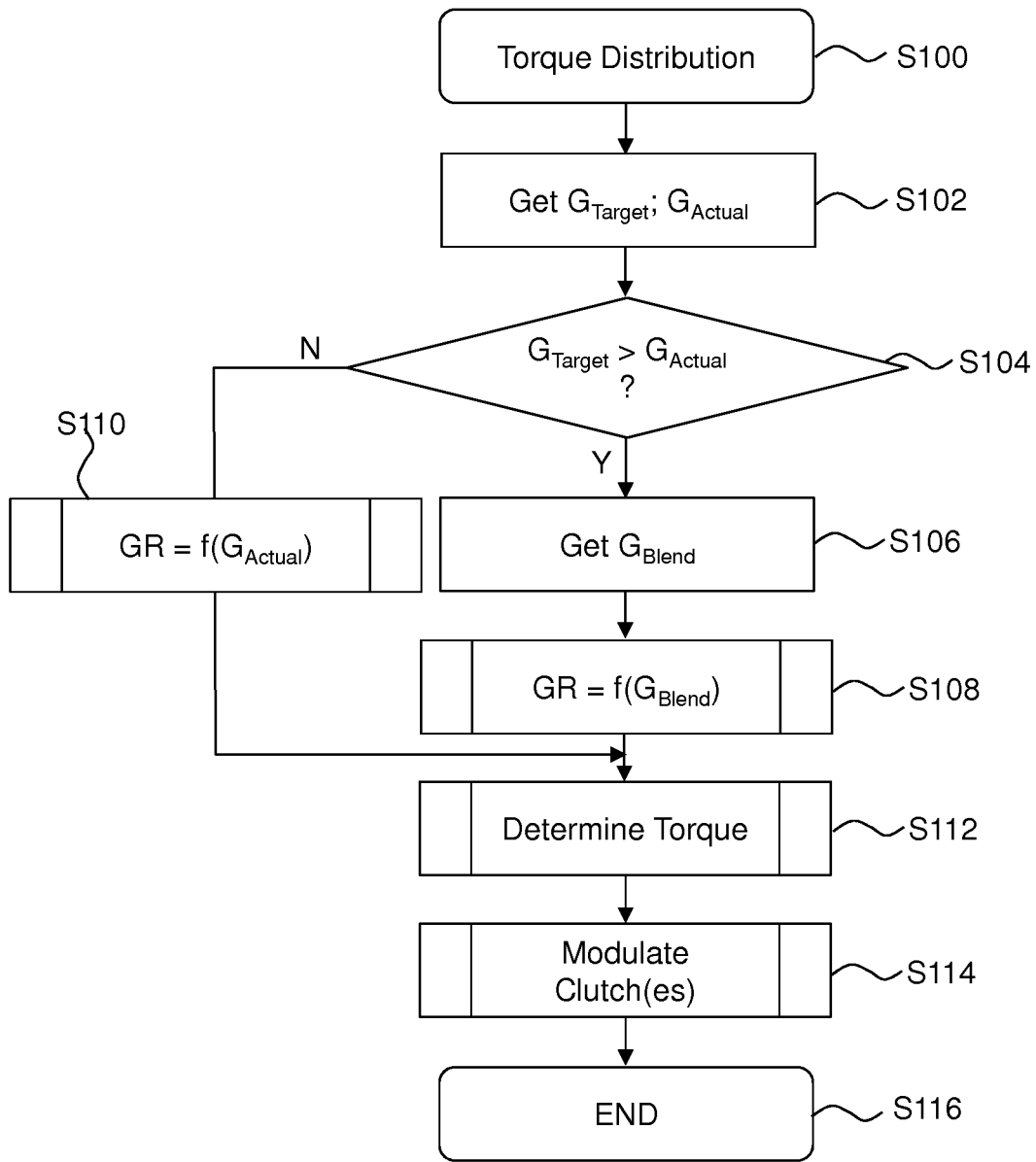
FIG. 2 is a flowchart depicting an exemplary torque distribution algorithm in accordance with the disclosed subject matter.

FIG. 2 illustrates an exemplary algorithm that the second controller 38 can follow in order to generate a signal indicative of a torque distribution strategy for the front wheels 14L, 14R and each of the rear wheels 16L, 16R. This exemplary algorithm can permit the second controller 38 to compensate for the gradually decreasing torque output by the transmission during an upshift event. As a result, the second controller 38 can more accurately estimate the real-time torque output by the transmission 20 during an upshift event.

The second controller 38 can begin the torque distribution algorithm at step S100. Then, the second controller 38 can proceed to step S102.

At step S102, the second controller 38 can receive data from the first controller 36 indicative of the target gear number, $G_{Target}$, and the actual gear number, $G_{Actual}$, where the target gear number, $T_{Target}$, can be equal to the value of the gear number to which the transmission 20 is shifting, and the actual gear number, $G_{Actual}$, can be equal to the value of the gear number from which the transmission 20 is shifting. The values of the target gear and the actual gear can be integer values from 1 to n, where n is equal to the total number of forward gear choices included in the transmission 20. For example, if the transmission 20 is shifting from the second gear to the third gear, then $G_{Target}$=3 and $G_{Actual}$=2. The second controller 38 can then proceed to step S104.

As discussed above, the first controller 36 can be configured to signal the transmission 20 to gradually decrease the amount of torque output by the transmission 20 during an upshift event. In an effort to enhance the effectiveness of the torque distribution during the upshift event, the second controller 38 can be configured to compensate for this gradual decrease in the output torque. The second controller 38 can compare the value of the target gear number, $G_{Target}$, to the value of the actual gear number, $G_{Actual}$, at step S104. This comparison can allow the second controller 38 to determine whether or not the transmission 20 is undergoing an upshift event.

If the second controller 38 determines as step S104 that the value of the target gear number, $G_{Target}$, is greater than the value of the actual gear number, $G_{Actual}$, then the second controller 38 can proceed to step S106. At step S106, the second controller 38 can retrieve the value of a blended gear number, $G_{Blend}$, from a memory storage device such as but not limited to a RAM device or any other appropriate source. The blended gear value, $G_{Blend}$, can have any real number value between 1 and n, where n is equal to the total number of gears included in the transmission 20. Exemplary embodiments are intended to cover a blended gear value, $G_{Blend}$, that varies during an upshift event in a manner that corresponds to the rate of decrease of the output torque signaled by the first controller 36 to the transmission 20. For example, if the first controller 36 signals the transmission 28 to gradually decrease the torque in a linear manner during the upshift event, then the second controller 38 can be configured to increase the blended gear value $G_{Blend}$, in a corresponding linear manner.

The blended gear number, $G_{Blend}$, can permit the second controller 38 to determine an approximate value for the gear ratio, GR, that decreases in proportion to the rate of decrease in the torque output by the transmission 20. As a result, the second controller 38 can compensate for the reduced torque output during an upshift event performed in the transmission 20. Details of the determination of the blended gear number, $G_{Blend}$, will be discussed in greater detail below with respect to FIGS. 3-5.

From step S106, the second controller 38 can proceed to step S108. Here, the second controller 38 can determine an appropriate value for the gear ratio, GR, that is based on the value of the blended gear number, $G_{Blend}$. As discussed above, the values of the actual gear, $G_{Actual}$, and the target gear, $G_{Target}$, can be integer numbers and the values of the gear ratio, GR, can be rational numbers. FIG. 3 shows an exemplary look-up table of values for the actual gear, $G_{Actual}$, and the target gear, $G_{Target}$, and the corresponding gear ratios, GR. FIG. 4 shows a portion of an exemplary look-up table of values for the blended gear number, $G_{Blend}$, and the corresponding blended values of the gear ratio, GR, useable by the second controller 38 during an upshift from the second gear to the third gear. Blended gear ratios can be calculated in a similar manner for all of the remaining gear numbers 1 and 3-6.

The blended values of the gear ratio, GR, can be predetermined using any appropriate mathematical process, such as but not limited to curve fitting, regression analysis, linear interpolation, non-linear interpolation (such as but not limited to polynomial interpolation, spline interpolation, rational interpolation, interpolation using a Gaussian process), etc. However, the second controller 38 of some embodiments is configured perform during step S108 any appropriate mathematical process discussed above in order to determine the blended gear ratio. Equation (1) provided below represents an exemplary simple linear interpolation formula that can be used to populate the look-up table implemented during step S108 or used by the second controller 38 to calculate a blended value for the gear ratio, GR, where x is incremented from zero (0) to one (1) by a predetermined amount that can correspond to the rate of decrease of the torque output by the transmission 20.

$$GR=(1-x)(GR_{Actual})+(x)(GR_{Target}). \quad (1)$$

If the second controller 38 determines at step S104 that the value of the target gear, $G_{Target}$, is not greater than the value of the actual gear, $G_{Actual}$, then the second controller 38 can proceed to step S110. This result can be indicative of either a downshift event occurring in the transmission 20, or that no shift event is occurring in the transmission 20. Compensation for a decreasing torque output may not be advantageous in determining the torque distribution between the front wheels 14L, 14R and the rear wheels 16L, 16R during the operating conditions of the transmission 20. As a result, the second controller 38 can retrieve the appropriate gear ratio value, GR, from the look-up table of FIG. 3, based on the value of the actual gear, $G_{Actual}$.

From steps S108 and S110, the second controller 38 can proceed to step S112.

Step S112 can be configured as a subroutine that can permit the second controller 38 to determine an estimation of the real-time torque output by the transmission 20. This estimated real-time torque can be based on the gear ratio value, GR, (determined at step S108 or at step S110), rotational speed of the power source, a torque map for the power source, a torque converter map, and any predictable driveline losses. The second controller 38 can then proceed to step S114.

Step S114 can be configured as a subroutine that can permit the second controller 38 to configure and send signal(s) to one or both of the clutch assemblies 40L, 40R. The signal(s) issued by the second controller 38 to one or both of the clutch assemblies 40L, 40R can affect the manipulation discussed above.

The second controller 38 can then proceed to step S116 where the second controller 38 can exit the torque distribution algorithm.

III. Determination of the Blended Gear Number $G_{Blend}$

Figure 5:
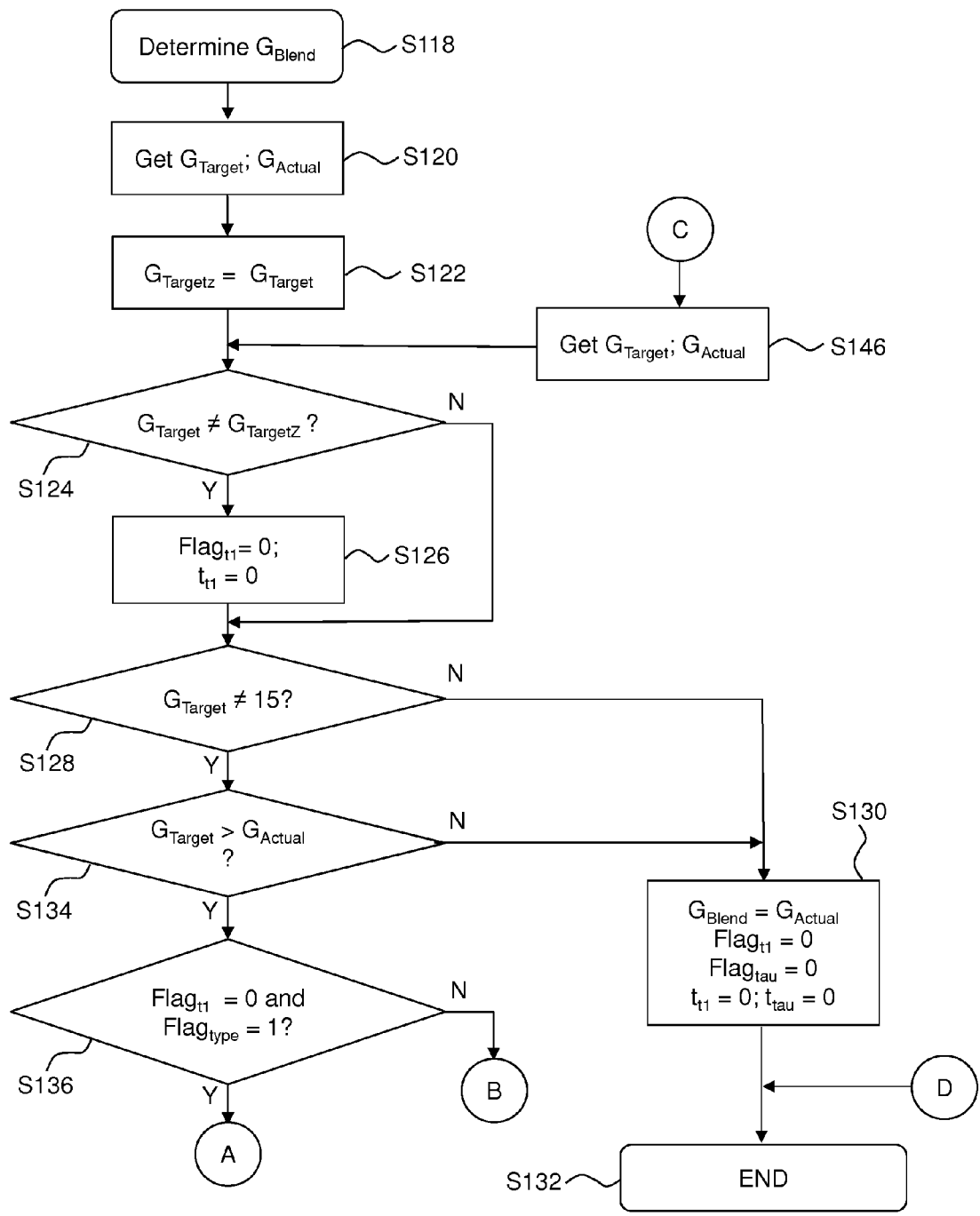
FIG. 5 is a flowchart depicting an exemplary blending algorithm in accordance with the disclosed subject matter.

Determination of a value of the blended gear number, $G_{Blend}$, will be discussed with respect to FIGS. 5-7, which illustrate an exemplary algorithm that the second controller 38 can follow in order to determine incremental values for the blended gear number, $G_{Blend}$.

The second controller 38 can begin the blending algorithm at step S118. The second controller 38 can then proceed to step S120.

At step S120, the second controller 38 can retrieve current values of the actual gear number, $G_{Actual}$, and the target gear number, $G_{Target}$, from the first controller 36 or from any other appropriate source, such as but not limited to a memory storage device. Exemplary embodiments are intended to cover a first controller 36 that continuously signals the second controller 38 with the real-time values of the actual gear number, $G_{Actual}$, and the target gear number, $G_{Target}$. The second controller 38 can then proceed to step S122.

At step S122, the second controller 38 can set a target gear check, $G_{TargetZ}$, to a value that is equal to the current value of the target gear number, $G_{Target}$. The second controller 38 can store the value of the target gear number check, $G_{TargetZ}$, in any appropriate memory storage device for later retrieval by the second controller 38. The second controller 38 can then proceed to step S124.

At step S124, the second controller 38 can compare the current value of the target gear number, $G_{Target}$, to the stored value of the target gear check, $G_{TargetZ}$. If the second controller 38 determines at step S124 that the current value of the target gear number $G_{Target}$ is not equal to the stored value of the target gear check, $G_{TargetZ}$, then the second controller 38 can proceed to step S126.

At step S126, the second controller 38 can set the values of a first timer flag, $Flag_{t1}$, equal to zero (0) and a first timer, $t_{t1}$, equal to zero (0). In other words, step S126 can permit the second controller 38 to reset the first timer, $t_{t1}$. Further details of the first timer flag, $Flag_{t1}$, and the first timer, $t_{t1}$, will be discussed below.

Thus, steps S124 and S126 can be effective when the current values of the target gear number, $G_{Target}$, and the actual gear number, $G_{Actual}$, have changed simultaneously during execution of the blending algorithm. The second controller 38 can then proceed from step S126 to step S128.

If the second controller 38 does not determine at step S124 that the current value of the target gear number $G_{Target}$ is not equal to the stored value of the target gear check, $G_{TargetZ}$, then the second controller 38 can skip step S126 and proceed to step S128.

Step S128 can permit the second controller 38 to verify that the current value of the target gear number, $G_{Target}$, is a valid value. If the second controller 38 determines at step S128 that the current value of the target gear number, $G_{Target}$, is invalid, then the second controller 38 can proceed to step S130.

At step S130, the second controller 38 can reset the parameters of the blending algorithm. Specifically, the second controller 38 can set the current value of the blended gear number, $G_{Blend}$, to equal the current value of the actual gear number, $G_{Actual}$, and store the value of the blended gear number, $G_{Blend}$, in any appropriate memory storage device for retrieval during execution of the torque distribution algorithm illustrated in FIG. 2. Additionally, the second controller 38 can set all of the first timer flag, $Flag_{t1}$, the tau timer flag, $Flag_{tau}$, the first timer, $t_{t1}$, and the tau timer, $t_{tau}$, to be equal to zero (0). The tau timer flag, $Flag_{tau}$, and the tau timer, $t_{tau}$, will be described in further detail below.

If the value of the target gear number, $G_{Target}$, is an invalid number, then it may not be advantageous for the second controller 38 to execute the blending algorithm. As such, the second controller 38 can proceed from step S130 to step S132 where the second controller 38 can exit the blending algorithm.

If the second controller 38 determines at step S128 that the current value of the target gear number, $G_{Target}$, is not invalid, then the second controller 38 can proceed to step S134.

At step S134, the second controller 38 can determine whether an upshift event is occurring in the transmission 20. As discussed above, it may not be advantageous for the second controller 38 to execute the blending algorithm if an upshift event is not occurring in the transmission 20. Specifically, during execution of step S134, the second controller 38 can compare the current value of the target gear number, $G_{Target}$, to the current value of the actual gear number, $G_{Actual}$.

If the second controller 38 determines that the current value of the target gear number, $G_{Target}$, is not greater than the current value of the actual gear number, $G_{Actual}$, then the second controller 38 can proceed to steps S130 and S132 described above. In other words, the second controller 38 has determined that an upshift event is not occurring in the transmission 20 and the second controller 38 can exit the blending algorithm.

If the second controller 38 determines that the current value of the target gear number, $G_{Target}$, is greater than the current value of the actual gear number, $G_{Actual}$, then the second controller 38 proceed to step S136. In other words, the second controller 38 has determined that an upshift event is occurring in the transmission 20.

The first controller 36 can be configured to divide the upshift event into two stages. During the first stage of the upshift event, the first controller 36 can be configured to issue signal(s) to one or more actuators in the transmission 20 in preparation for a shift signal. During the second stage of the upshift event, the first controller 36 can be configured to issue the signal effecting the gradual decrease of the torque output by the transmission 20. The second stage can immediately follow the first stage. The first controller 34 can be configured to not signal the gradual decrease in output torque during the first stage of the upshift event.

Because the first controller 36 does not signal the transmission 20 to gradually reduce its torque output during the first stage of the upshift event, the second controller 38 can be configured to run the first timer, $t_{t1}$, so that the second controller 38 can delay its determination of the current value for the blended gear number, $G_{Blend}$. Exemplary embodiments are intended to cover a first controller 36 and a second controller 38 that are configured to issue and receive, respectively, a signal indicating the start of the second stage of the upshift event occurring in the transmission 20.

Step 136 of the blending algorithm can permit the second controller 38 to accommodate each of these scenarios. Specifically, the second controller 38 can be configured to compare the first timer flag, $Flag_{t1}$, and a type flag, $Flag_{type}$, to respective predetermined values. The first controller 36 can be configured to send the current value of the type flag, $Flag_{type}$, to the second controller 38, and the second controller 38 can be configured to receive the value of the type flag, $Flag_{type}$, from the first controller 36. If the first controller 36 is not configured to send the current value of the type flag, $Flag_{type}$, to the second controller 38, then the value of the type flag, $Flag_{type}$, can be stored in an appropriate memory device as a permanent value equal to one (1).

If the second controller 38 determines at step S136 that the current value of the first timer flag, $Flag_{t1}$, is equal to zero (0) and the value of the type flag, $Flag_{type}$, is equal to one (1), then the second controller 38 can determine that the first stage of the upshift event is occurring and that a blended gear ratio is not yet advantageous. As such, the second controller 38 can proceed to the delay operation of the blending algorithm illustrated in FIG. 6.

Figure 7:
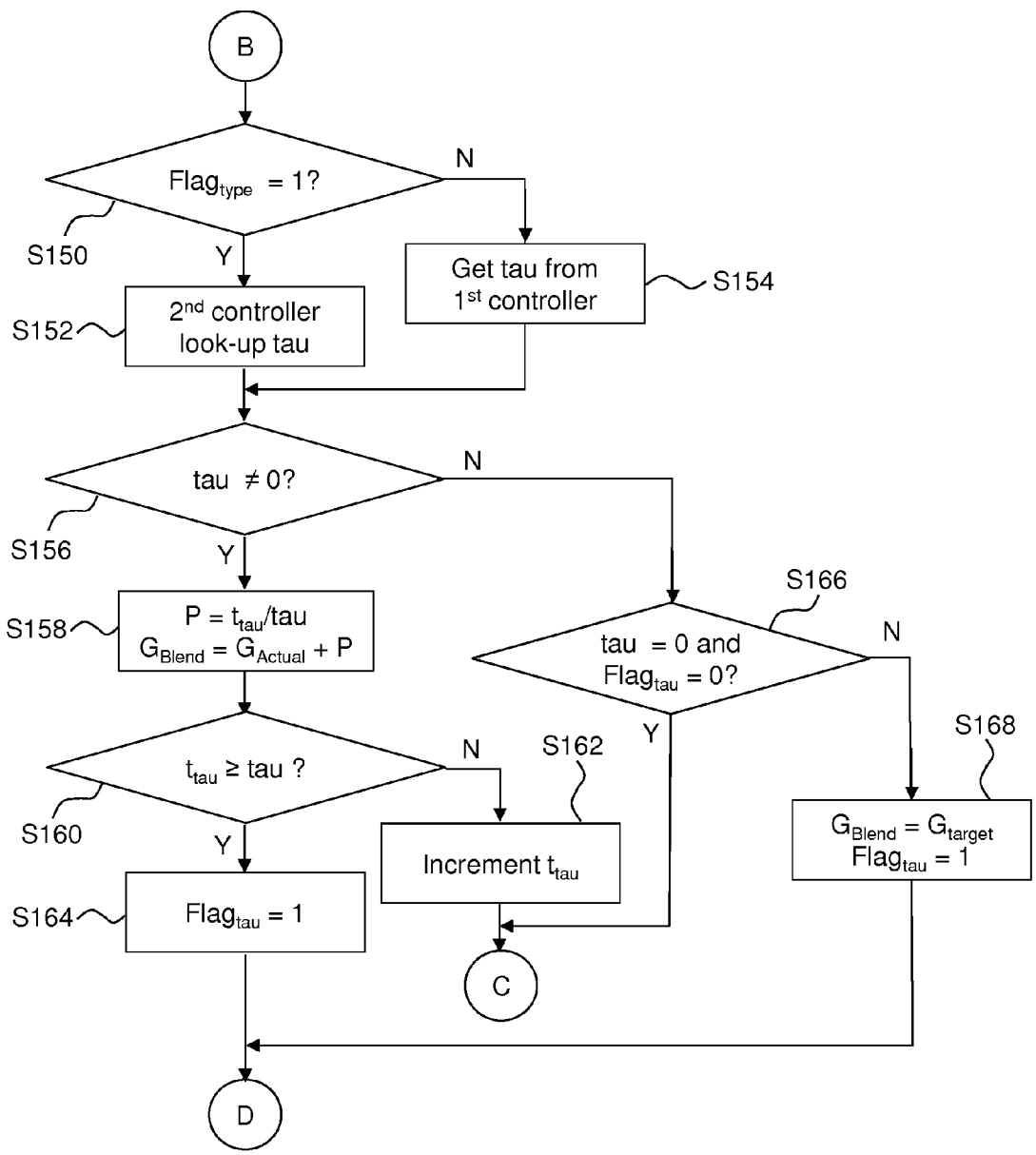
FIG. 7 is a flowchart that is a continuation of the flowchart of FIG. 5.

If the second controller 38 determines at step S136 that the current value of the first timer flag, $Flag_{t1}$, is not equal to zero (0) or the value of the type flag, $Flag_{type}$, is not equal to one (1), then the second controller 38 can determine that the second stage of the upshift event is occurring, and the second controller 38 can proceed to the gear number blending operation of the blending algorithm illustrated in FIG. 7.

Figure 6:
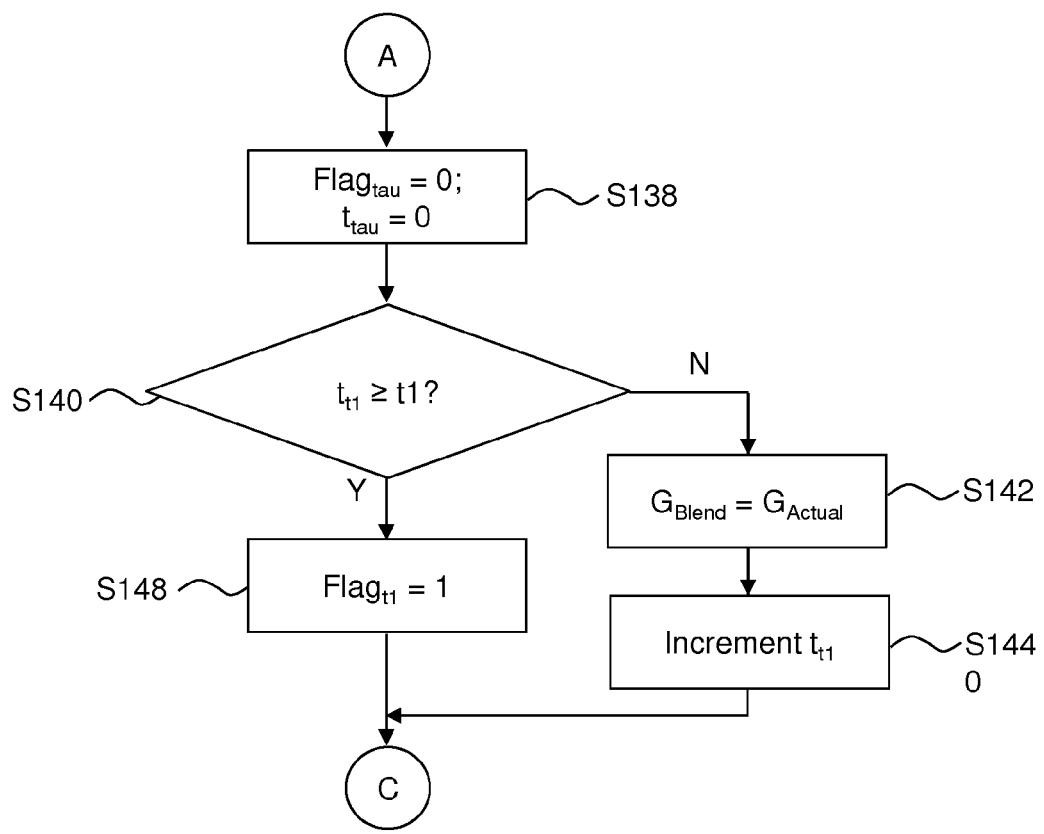
FIG. 6 is a flowchart that is a continuation of the flowchart of FIG. 5.

Referring to FIG. 6, if the second controller 38 determines that both conditions of step S136 are satisfied, then the second controller 38 can proceed to step S138. Here, the second controller 38 can set the current value of the blend flag, $Flag_{tau}$, to equal zero (0), and the current value of the blend timer, $t_{tau}$, to equal zero (0). The blend flag, $Flag_{tau}$, and the blend timer, $t_{tau}$, will be discussed in further detail below.

The second controller 38 can proceed from step S138, to step S140. Here, the second controller 38 can compare the current value of the first timer, $t_{t1}$, to a first timer threshold, t1. The first timer threshold, t1, can be a predetermined value, and can be dependent or independent of the current values of the actual gear number and the target gear number. If the first timer threshold, t1, is dependent on the actual gear number and/or the target gear number, then the second controller 38 can be configured to retrieve the appropriate value for the first timer threshold from a look-up table stored in any appropriate memory device.

If the second controller 38 determines at step S140 that the current value of the first timer, $t_{t1}$, is less than the first timer threshold, t1, then the second controller 38 can determine that the first stage of the upshift event is not yet complete. The second controller 38 can then proceed to step S142.

Since the upshift event is in the first stage, a blended value of the gear ratio may not be advantageous. As such, the second controller 38 can set the current value of the blended gear number, $G_{Blend}$, to equal the current value of the actual gear number, $G_{Actual}$, at step S142. The second controller 38 can store the current value of the blended gear number, $G_{Blend}$, in any appropriate memory storage device for retrieval and use in the torque distribution algorithm illustrated in FIG. 2. The second controller 38 can then proceed to step S144.

At step S144, the second controller 38 can increment the first timer, $t_{t1}$, by any appropriate increment. The second controller 38 can then proceed to step S146.

Step S146 can permit the second controller 38 to receive the current values of the actual gear number, $G_{Actual}$, and the target gear number, $G_{Target}$, sent from the first controller 36. Then, the second controller can return to step S124 and follow the blending algorithm as discussed above.

If the second controller 38 determines at step S140 that the current value of the first timer, $t_{t1}$, is greater than or equal to the first timer threshold, t1, then the second controller 38 can determine that the first stage of the upshift event is complete. The second controller 38 can then proceed to step S148.

At step 148, the second controller 38 can set the current value of the first timer flag, $Flag_{t1}$, equal to one (1). The second controller 38 can proceed from step S148 to step S146 of FIG. 5 and can proceed as discussed above.

Referring to FIG. 7, if the second controller 38 determines that one of the conditions of step S136 is not met, then the second controller 38 can determine that the first stage of the upshift event is complete and can proceed to step S150.

Step S150 can permit the second controller 38 to determine whether the current value of a blend timer threshold, tau, will be sent by the first controller 36 or retrieved from any appropriate memory storage device. The blend timer threshold can be a predetermined constant value, or the blend timer threshold can be based on one or more inputs, as discussed below.

If the second controller 38 determines that the current value of the type flag, $Flag_{type}$, equals 1, then the second controller 38 can proceed to step S152, where the second controller 38 can retrieve the current value of the blend timer threshold, tau, from an appropriate memory storage device.

If the second controller 38 determines that the current value of the type flag, $Flag_{type}$, does not equal one (1), then the second controller 38 can proceed to step S154, where the second controller 38 can receive the current value of the blend timer threshold, tau, from the first controller 36. The first controller 36 can be configured to determine an appropriate value indicative of the elapsed time for the second stage of the upshift event. This elapsed time can be based on any combination of current actual gear number, the current target gear number, and operating parameters of the transmission, such as but not limited to transmission fluid temperature, engine load, vehicle speed, the number of clutches/actuators involved in the upshift event, an estimated wear of the involved clutch(es), etc. The first controller 36 can be configured to send this value of the elapsed time to the second controller 38. The second controller 38 can be configured to receive this value of the elapsed time and assign it as the current value of the blend timer threshold, tau.

From steps S152 and S154, the second controller 38 can proceed to step S156. Here, the second controller 38 can verify that the blend timer threshold, tau, has a value greater than zero (0). If the second controller 38 determines at step S156 that the blend timer threshold is not equal to zero (0), then the second controller 38 can proceed to step S158.

Step S158 can permit the second controller 38 to determine the current value of the blended gear number, $G_{Blend}$. Here, the second controller 38 can determine the current increment value, P, by dividing the current value of the blend timer, $t_{tau}$, by the current value of the blend threshold, tau. The second controller 38 can determine the current value of the blended gear number, $G_{Blend}$, by adding the current increment value, P, to the current value of the actual gear number, $G_{Actual}$. The second controller 38 can be configured to store the current value of the blended gear number, $G_{Blend}$, in any appropriate memory storage device for retrieval during execution of the torque distribution algorithm illustrated in FIG. 2. The second controller 38 can proceed from step S158 to step S160.

At step S160, the second controller 38 can compare the current value of the blend timer, $t_{tau}$, with the current value of the blend timer threshold, tau. In other words, the second controller 38 can check whether the blend timer, $t_{tau}$, has expired. Specifically, the second controller 38 can determine whether the current value of the blend timer, $t_{tau}$, is greater than or equal to the blend timer threshold, tau.

If the second controller 38 determines that the current value of the blend timer, $t_{tau}$, is less than the blend timer threshold, tau, (i.e., the blend timer has not expired), then the second controller 38 can proceed to step S162 where the second controller 38 can increment the current value of the blend timer, $t_{tau}$, by any appropriate value. From step S162, the second controller 38 can proceed to step S146 and return to step S124 as described above.

If the second controller 38 determines that the current value of the blend timer, $t_{tau}$, is greater than or equal to the blend timer threshold, tau, (i.e., the blend timer has expired), then the second controller 38 can proceed to step S164. At step S164, the second controller 38 can set the current value of the blend flag, $Flag_{tau}$, equal to one (1). This value of the blend flag, $Flag_{tau}$, can indicate that the blending process is complete. From step S164, the second controller 38 can proceed to step S132 where the second controller 38 can exit the blending algorithm.

Returning to the alternate condition of step S156, if the second controller 38 determines at step S156 that the blend timer threshold is equal to zero (0), then the second controller 38 can proceed to step S166.

Step S166 can be useful if the first controller 36 sends the current value for the blend timer threshold to the second controller 38. At step S166, the second controller 38 can compare the current values of the blend timer threshold, tau, and the blend flag, $Flag_{tau}$, to a respective predetermined value. Specifically, if the second controller 38 determines that the current value of the blend timer threshold, tau, is equal to zero (0), and that the current value of the blend flag, $Flag_{tau}$, is equal to zero (0), then the second controller 38 can proceed to step S146 and return to step S124 as discussed above. These two conditions can permit the second controller 38 to wait for the first controller 36 to send the current value for the blend timer threshold.

If the second controller 38 determines that the current value of the blend timer threshold, tau, is not equal to zero (0), or that the current value of the blend flag, $Flag_{tau}$, is not equal to zero (0), then the second controller 38 can proceed to step S168. If both of the conditions of step S166 are not met, then the second stage of the upshift event is complete or no upshift event is occurring in the transmission 20. As a result, the second controller 38 sets the current value of the blended gear number, $G_{Blend}$, to equal the current value of the target gear number, $G_{Target}$, and stores this value in any appropriate memory storage device for retrieval during execution of the torque distribution algorithm illustrated in FIG. 2. The second controller 38 can then proceed to step S132 where the second controller 38 can exit the blending algorithm.

IV. Plots of Values Over Time

Figure 8:
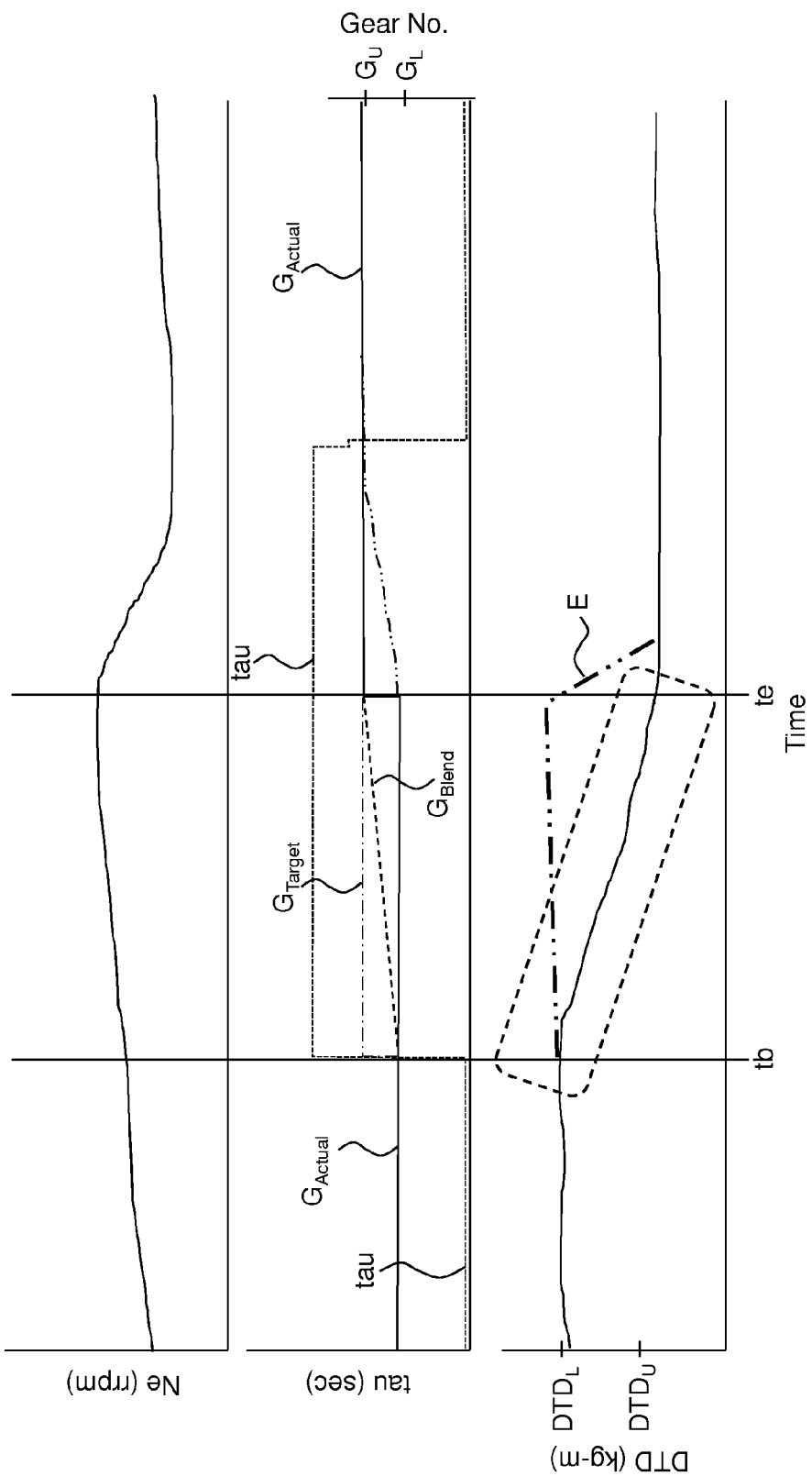
FIG. 8 is a graph depicting plots of engine speeds, timer signals, gear values, and estimated drive torques versus time in accordance with the disclosed subject matter.

FIG. 8 illustrates plots over time of values for the engine speed, Ne, the value of the blend timer threshold, tau, the gear numbers, $G_{Actual}$, $G_{Blend}$, $G_{Target}$, and the estimated torque, DTD. The blending algorithm can permit the second controller 38 to reduce the value of the estimated torque during the second stage (i.e., between the time tb and the time te) of the upshift event, as depicted in the encircled portion of the plot of the estimated torque, DTD.

If the second controller 38 does not execute the blending algorithm during the second stage of an upshift event depicted between time values, tb and te, then the second controller 38 can over-estimate the torque output by the transmission. An example of this over-estimation can be represented by the line E shown in the plot of the estimated torque, DTD. Thus, the blending algorithm can permit the second controller 38 to more accurately estimate the torque output by the transmission 20 during an upshift event.

Figure 9:
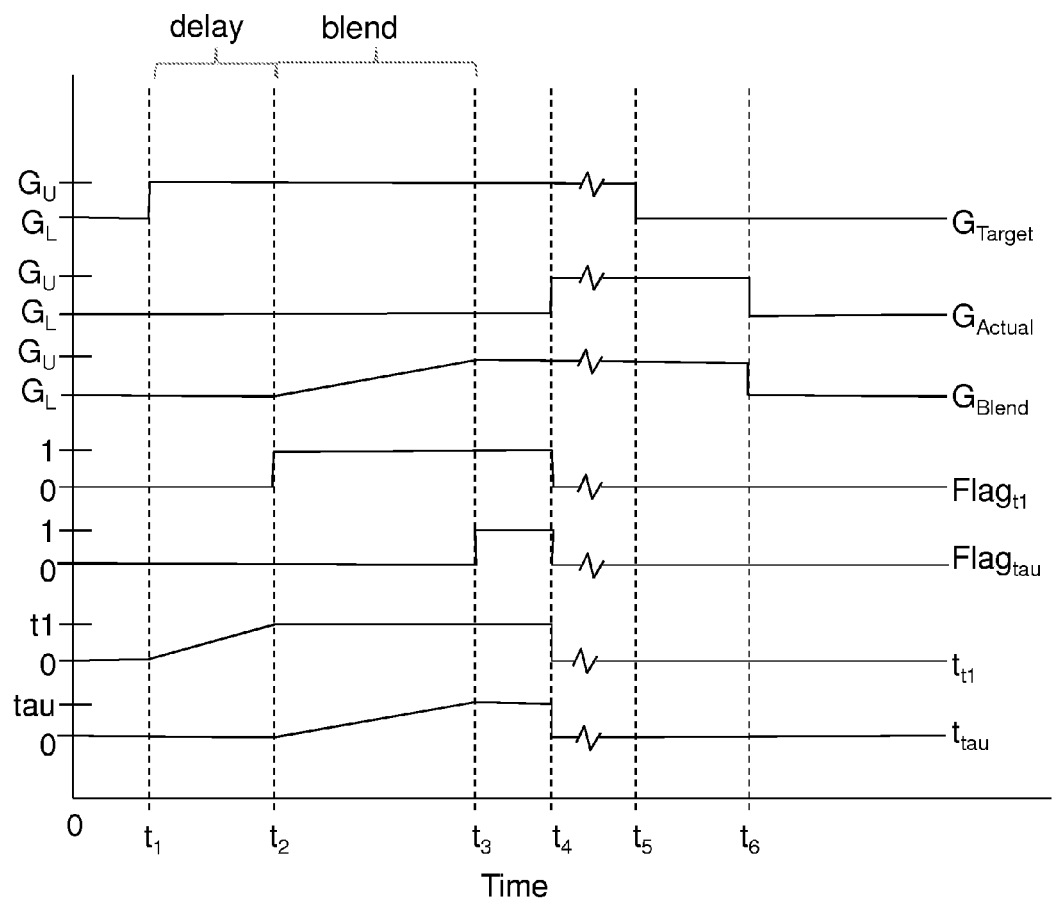
FIG. 9 is a graph depicting plots of gear values, flag values, and timer values versus time in accordance with the disclosed subject matter.

FIG. 9 shows plots of the gear numbers, $G_{Actual}$, $G_{Blend}$, $G_{Target}$, the flag values, $Flag_{t1}$, $Flag_{tau}$, and the timer values, $t_{t1}$, $t_{tau}$, over time. The first controller 36 can signal the transmission 20 to begin an upshift event time $t_1$. The first stage of the upshift event can occur between time $t_1$ and time $t_2$. The second stage of the upshift event and the gear ratio blending can occur between time $t_2$ and time $t_3$. At time $t_3$, the first controller 36 can initiate the upshift from the actual gear to the target gear. At time $t_{14}$, the shift to the target gear can be completed. At time $t_5$, the first controller 36 can issue a downshift signal to the transmission 20, and the transmission 20 can complete the downshift event at time $t_6$. The second controller 38 does not execute the blending algorithm during a downshift event.

V. Engine and System Components

The power source 18 can be an internal combustion engine, an electric motor or a hybrid of an internal combustion engine and an electric motor. The power source, which is configured as an internal combustion engine or a hybrid power source, can have the engine output axis oriented in the longitudinal direction L or in the traverse direction T of the vehicle. The engine can be mounted forward of the front axles, rearward of the rear axles, or intermediate the front and rear axles. In the exemplary embodiment of FIG. 1, the power source is configured as a traversely-oriented front-mounted internal combustion engine.

The transmission 20 can be an automatic transmission, a manual transmission, or a semi-automatic transmission. The transmission 20 can include an input shaft, an output shaft, and a speed ratio assembly. A coupling can connect the engine output shaft to the input shaft. The coupling can permit selective engagement/disengagement of the input shaft with the engine output shaft, or at least relative rotation of the engine output shaft with respect to the input shaft, in any appropriate manner. Exemplary couplings can include, but are not limited to, a friction disc clutch and a torque converter.

The speed ratio assembly can connect the input shaft to the transmission output shaft, such that the transmission output shaft can rotate at variable speeds relative to the input shaft. The speed ratio assembly can be a stepped speed ratio assembly or a continuously variable speed ratio assembly.

The front differential assembly 22 can be configured in any appropriate manner that can transmit a torque input from the transmission 20 to each of the driveshafts 24L, 24R while allowing one of the driveshafts 24L, 24R to rotate at a different speed relative to the other of the driveshafts 24L, 24R, such as when the vehicle 12 travels long a curved path or across a surface having a variable coefficient of friction. The front differential assembly 22 can be configured as an open differential or as a limited-slip differential.

The controllers 36, 38 can be referred to as an electronic control unit (ECU) or as a central processing unit (CPU). Embodiments of the controllers 36, 38 are intended to include any known, related art or later developed technologies.

Any sensor(s) constituting a component(s) of the control system 34 or that are in electrical communication with the control system 34 can be configured with hardware, with or without software, to perform the assigned task(s). The sensors can be configured as smart sensors, such that the sensors can process the raw data collected by the sensors prior to transmission to the controller(s) 36 and/or 38. Alternatively, the sensors can be configured as simple sensors that pass the raw data directly to the controller(s) 36 and/or 38 without any manipulation of the raw data. The sensors can be configured to send data to the controller(s) 36 and/or 38, with or without a prompt from the controller(s) 36 and/or 38.

A gear shift lever (not shown) can be connected to the transmission 14, electrically, mechanically, or electro-mechanically, in accordance with any known, related art or later developed configuration, such that actuation of the gear shift lever by the operator can effect a shift from one gear ratio to another gear ratio within the transmission 14. The gear shift lever can be a mechanical lever or an electrical switch. The gear shift lever can be mounted in any one of a plurality of different locations within the vehicle, including but not limited to, at the center console, at the steering column, at the steering wheel, and at the instrument panel.

VI. Alternative Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

For example, embodiments are disclosed above in the context of controlling an automatic transmission by adjusting its torque output during an upshift event. However, embodiments are intended to include or otherwise cover any aspect of torque distribution in a full-time or part-time 4WD powertrain. For example, the disclosed systems and methods can be used in other shifting events.

The storage device is disclosed as a separate and discrete component from both the first and second controllers. However, the storage device can form a part of or otherwise share the same unitary structure as either the first controller or the second controller.

The disclosed controllers include or otherwise cover known, related art and later developed processors and computer programs implemented by processors used to implement the disclosed operations.

Exemplary embodiments of the controllers are intended to cover all software or computer programs capable of enabling processors to implement the above operations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), Controller Area Networks (CANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background Section are hereby incorporated by reference in their entirety.

What is claimed is:

1. An apparatus for distributing torque output by a transmission of a vehicle, the transmission being shiftable between multiple gears, the apparatus comprising:
a first clutch assembly;
a second clutch assembly;
an electronic storage device that stores a blended gear number;
a first controller configured to determine a target gear number and an actual gear number during shifting between the gears of the transmission, the target gear number being equal to a value of a gear number to which the transmission is shifting, the actual gear number being equal to a value of a gear number from which the transmission is shifting; and
a second controller in electrical communication with the first clutch assembly and the second clutch assembly, and configured to:
compare the target gear number to the actual gear number, and to retrieve the blended gear number from the storage device if the target gear number is greater than the actual gear number,
determine an approximate value for a gear ratio that decreases in proportion to a rate of decrease in torque output by the transmission based on the blended gear number,
estimate a value of the torque output by the transmission based on the determined gear ratio; and
instruct at least one of the first clutch assembly and the second clutch assembly to vary the torque transmitted thereby based on the estimated value of the torque output by the transmission.

2. The apparatus of claim 1, wherein the target gear number and the actual gear number are each integer values from 1 to n, where n is equal to the total number of forward gear choices included in the transmission.

3. The apparatus of claim 1, wherein the blended gear number is any number between 1 and n, where n is the total number of gears included in the transmission, and the blended gear number varies during an upshift event in a manner that corresponds to a rate of decrease of an output torque signaled by the first controller to the transmission.

4. The apparatus of claim 1, wherein the second controller is configured to utilize a first look-up table including values for the actual gear number, target gear number, and corresponding gear ratios.

5. The apparatus of claim 4, wherein the second controller is configured to utilize a second look-up table including values for the blended gear number and corresponding gear ratios.

6. The apparatus of claim 1, wherein the first controller continuously transmits the target gear number and the actual gear number to the second controller.

7. The apparatus of claim 1, wherein the second controller is configured to: set a target gear check to a value that is equal to the current value of the target gear number; and compare the current value of the target gear number to the set target gear check.

8. The apparatus of claim 7, wherein if, based on the comparison, the second controller determines that the current value of the target gear number is not equal to the set target gear check based on the comparison, then the second controller is configured to set values of a first timer flag equal to 0, and a first timer equal to 0.

9. The apparatus of claim 8, wherein if the second controller determines that the current value of the target gear number is greater than the current value of the actual gear number, then the second controller is configured to compare the first timer flag and a type flag to respective predetermined values.

10. The apparatus of claim 9, wherein if the second controller determines that the current value of the first timer flag is equal to 0 and the value of the type flag is equal to 1, then the second controller is configured to determine that a first stage of an upshift event is occurring and that a blended gear ratio is not advantageous; while if the second controller determines that the current value of the first timer flag is not equal to 0 and the value of the type flag is not equal to 1, then the second controller is configured to determine that a second stage of an upshift event is occurring and that a gear number blending operation would be advantageous.

11. A method for distributing torque output by a transmission of a vehicle, the transmission being shiftable between multiple gears, the method comprising:
storing a blended gear number;
using a first processor to determine a target gear number and an actual gear number during shifting between the gears of the transmission, the target gear number being equal to a value of a gear number to which the transmission is shifting, the actual gear number being equal to a value of a gear number from which the transmission is shifting;
using a second processor to:
compare the target gear number to the actual gear number, and to retrieve the blended gear number from the storage device if the target gear number is greater than the actual gear number,
determine an approximate value for a gear ratio that decreases in proportion to a rate of decrease in torque output by the transmission based on the blended gear number, and
estimate a value of the torque output by the transmission based on the determined gear ratio; and
operating at least one of a pair of clutch assemblies based on the estimated value of the torque output by the transmission.

12. The method of claim 11, wherein the target gear number and the actual gear number are each integer values from 1 to n, where n is equal to the total number of forward gear choices included in the transmission.

13. The method of claim 11, wherein the blended gear number is any number between 1 and n, where n is the total number of gears included in the transmission, and the blended gear number varies during an upshift event in a manner that corresponds to a rate of decrease of an output torque signaled by the first processor to the transmission.

14. The method of claim 11, wherein the step of using the second processor includes utilizing a first look-up table including values for the actual gear number, target gear number, and corresponding gear ratios; and utilizing a second look-up table including values for the blended gear number and corresponding gear ratios.

15. The method of claim 11, further including using the first processor to continuously transmit the target gear number and the actual gear number to the second processor.

16. The method of claim 11, further including using the second processor to set a target gear check to a value that is equal to the current value of the target gear number; and to compare the current value of the target gear number to the set target gear check.

17. The method of claim 16, further including using the second processor to determine whether the current value of the target gear number is not equal to the set target gear check based on the comparison, and if so, then using the second processor to set values of a first timer flag equal to 0, and a first timer equal to 0.

18. The method of claim 17, further including using the second processor to determine whether the current value of the target gear number is greater than the current value of the actual gear number, and if so, then using the second processor to compare the first timer flag and a type flag to respective predetermined values.

19. The method of claim 18, further including using the second processor to determine whether the current value of the first timer flag is equal to 0 and the value of the type flag is equal to 1, and if so then using the second processor to determine that a first stage of an upshift event is occurring and that a blended gear ratio is not advantageous; while also using the second processor to determine whether the current value of the first timer flag is not equal to 0 and the value of the type flag is not equal to 1, and if so then using the second processor to determine that a second stage of an upshift event is occurring and that a gear number blending operation would be advantageous.

20. A torque distribution control system for distributing torque output by a transmission among front and rear wheels of a vehicle, the transmission being shiftable between multiple gears, the vehicle including at least one clutch configured to selectively couple at least one of the front and rear wheels to the transmission, the torque distribution control system comprising:
an electronic storage device that stores a blended gear number;
a first controller configured to determine a target gear number and an actual gear number during shifting between the gears of the transmission, the target gear number being equal to a value of a gear number to which the transmission is shifting, the actual gear number being equal to a value of a gear number from which the transmission is shifting; and a second controller configured to:
  compare the target gear number to the actual gear number, and to retrieve the blended gear number from the storage device if the target gear number is greater than the actual gear number,
  determine an approximate value for a gear ratio that decreases in proportion to a rate of decrease in torque output by the transmission based on the blended gear number,
  estimate an output torque based on the determined gear ratio,
  determine a torque distribution based on the estimated torque among the front and rear wheels, and
  instruct the clutch to couple the at least one of the front and the rear wheels to the transmission based on the determined torque distribution.

\* \* \* \* \*